US007162436B1

(12) United States Patent
Eckel, Jr.

(10) Patent No.: US 7,162,436 B1
(45) Date of Patent: Jan. 9, 2007

(54) SYSTEM AND METHOD FOR PAIRING PROVIDERS WITH CONSUMERS OF ONLINE GOODS AND SERVICES

(75) Inventor: John R. Eckel, Jr., Houston, TX (US)

(73) Assignee: In-Development, LLC, Houston, TX (US)

( * ) Notice: Subject to any disclaimer, the term of this patent is extended or adjusted under 35 U.S.C. 154(b) by 0 days.

(21) Appl. No.: 09/405,807

(22) Filed: Sep. 24, 1999

(51) Int. Cl.
*G06Q 30/00* (2006.01)
(52) U.S. Cl. .......................... 705/26; 705/17; 705/35; 705/40; 709/245
(58) Field of Classification Search ................ 709/217, 709/203, 229, 245; 707/10, 3, 4, 104.1; 705/26, 705/17, 73, 7, 14, 27, 35, 40
See application file for complete search history.

(56) References Cited

U.S. PATENT DOCUMENTS

| | | | | |
|---|---|---|---|---|
| 5,764,906 | A | | 6/1998 | Edelstein et al. ...... 395/200.49 |
| 5,878,141 | A | * | 3/1999 | Daly et al. ..................... 705/78 |
| 5,890,139 | A | | 3/1999 | Suzuki et al. ................. 705/27 |
| 6,009,459 | A | * | 12/1999 | Belfiore et al. ............... 707/10 |
| 6,038,537 | A | * | 3/2000 | Matsuoka ....................... 705/7 |
| 6,055,512 | A | * | 4/2000 | Dean et al. .................... 705/17 |
| 6,085,242 | A | * | 7/2000 | Chandra ...................... 709/223 |
| 6,151,624 | A | * | 11/2000 | Teare et al. ..................... 707/5 |

(Continued)

FOREIGN PATENT DOCUMENTS

EP  0 848 339 A1  * 12/1996

WO  WO 99/46707   9/1999

OTHER PUBLICATIONS

Computergram International, "Network Gets Patent For URL-Keyword Mapping" n120, pCGN06170032, Jun. 17, 1998.*

(Continued)

*Primary Examiner*—Yogesh C. Garg
(74) *Attorney, Agent, or Firm*—Fish & Richardson P.C.

(57) ABSTRACT

A method and system is provided that operates as an intelligent intermediary between online consumers and providers of goods and services. The system operates to receive a request initiated by a consumer and transmitted over a global communication network (e.g., the Internet), said request comprised of a highly intuitive and simple domain name (e.g., INEEDACAB.COM) further associated with a large family of domain names (e.g., INEEDAHOTELROOM.COM and INEEDHOMEREPAIRS.COM) each of which includes a common domain name element (e.g., INEED). In response to receiving the request, the system determines the subject matter of the request and operates to select at least one name of at least one provider related to the subject matter using a name linking policy. Thereafter, the system operates to forward the selected at least one name of the at least one provider to the consumer, along with comparative pricing and availability information regarding goods and services offered by the selected provider(s), allowing the consumer to make optimized choices regarding which provider(s) with whom to communicate and, optionally, transact business. Privacy and payment instructions, consumer preferences, provider history and other instructive information for each consumer are maintained by the system in a common database to further facilitate commercial transactions between a consumer and a provider.

80 Claims, 2 Drawing Sheets

U.S. PATENT DOCUMENTS

| | | | |
|---|---|---|---|
| 6,311,178 B1 * | 10/2001 | Bi et al. | 707/3 |
| 6,341,306 B1 * | 1/2002 | Rosenschein et al. | 345/804 |
| 6,405,214 B1 * | 6/2002 | Meade, II | 707/104.1 |
| 6,412,014 B1 * | 6/2002 | Ryan | 709/245 |
| 6,421,729 B1 * | 7/2002 | Paltenghe et al. | 709/229 |
| 6,446,048 B1 * | 9/2002 | Wells et al. | 705/35 |
| 2001/0020242 A1 * | 9/2001 | Gupta et al. | 74/473.3 |
| 2002/0004754 A1 * | 1/2002 | Gardenswartz et al. | 705/26 |

OTHER PUBLICATIONS

Traderonline.com (Press release, "Florida Tops Boat Trader® Online Activity", PR Newswire, New York; Sep. 22, 1998, pp. marked 1, 2, copy of listing of various Internet sites of Traderonline.com as published in 1997, pp. marked 3,4,5, Press release.*

Turner, Rob ("The price is right", Money; New York; May 1999, extracted from Internet on Apr. 4, 2002).*

Springer, Elise, "Computer & Media Notes from Underground"; Apr. 19, 1999, extracted from Google.com on Internet on Sep. 14, 2003.*

(Business editors, "Click4 Network launches one million dollar Internet Service Giveaway"; Business Wire; New York; Apr. 26, 1999; p. 1 extracted on Internet from proquest database on Apr. 30, 2004.*

* cited by examiner

SYSTEM AND METHOD FOR PAIRING PROVIDERS WITH CONSUMERS OF ONLINE GOODS AND SERVICES

BACKGROUND OF THE INVENTION

1. Technical Field of the Invention

The present invention generally relates to the field of global communication networks (e.g., Internet) and, in particular, to an online system and method that pairs or matches, in a customized, intelligent manner, users of a global communication network with providers of goods and services, utilizing a unique domain name request and linking service and an intelligent system of comparing and matching users with providers of such goods and services, ultimately facilitating a business transaction between said user and said provider(s).

2. Description of Background and Related Art

An ever-increasing number of online providers of goods and services, coupled with unprecedented and exponential growth of online consumer traffic, has placed consumers of online goods and services at risk of experiencing information and advertising overload. Every day, more than three thousand domain names are registered through Network Solutions, Inc. ("NSI") for just the ".com", ".net" and ".org" versions of domain names. Moreover, tens of thousands of new users join the Internet each day across the world, a rate which even according to the most skeptical predictions will continue to experience exponential growth. With less than half of all companies in the United States currently offering products and services online, the real crush of online commerce has yet to be experienced. Indeed, it is estimated that over 1.5 million small businesses alone will be offering goods or services online by the year 2002.

To date, an online consumer or potential consumer of goods or services has either already determined his or her source of such goods or services, and therefore just visited the web page or e-commerce presence of such source, or has attempted to locate reputable and reliable sources of the desired good or service employing meta search engines and the like. The former approach has been unduly complicated due to the fact that, despite the almost ubiquitous use of universal resource locators (URLs) in advertising and promotional materials, known sources of goods or services are not always located at the ".com" version of their famous marks or names. In other words, for example, going to "unitedairlines.com" might not always produce the desired result, since, for a variety of reasons, United Airlines' online presence might actually be located at "united-airlines.com", "united_airlines.com", "unitedairlines.net", "ua.com", or the like. After several attempts, one discovers that the site is actually located at "ual.com". Additionally, even once the correct URL is determined, the web presences for many well-known sources for traditional goods and services are little more than online advertisements, often lacking true e-commerce functions (i.e. online sales) capability. Accordingly, reliance on this method of identifying online sources of desired goods and services is limited at best.

The latter approach, using search engines and the like to locate sources of goods and services, is practically useless to would-be consumers due to the imprecise and voluminous nature of results produced by same. For example, a recent search for "airline reservations" on the popular meta search engine DogPile® (www.dogpile.com) produced 27,976 results ("hits"). Not only does such an example illustrate the overwhelming volume of information produced in response to virtually any search request, but a quick, more detailed, review of the first 20 or so hits (purportedly ranked in order of "relevance" to the search request) revealed that a number of such "relevant" hits were not sources of such services, but were actually mere uses of one or both of the key words of the search request within other, unrelated contexts. Moreover, even where a potential consumer is successful in locating a source from search results produced by a search engine, the reputation and reliability of such source is often unclear. Accordingly, use of meta search engines in an attempt to locate desired goods and services online is as often frustrating as it is ultimately unsuccessful.

Even assuming proper identification and location of a desired provider is ultimately achieved by a consumer, consummation of one or more business transactions between a consumer and a provider is often unnecessarily complicated, sometimes to the point that the proposed transaction is precluded altogether, due, at least in part, to unfamiliar functionality or appearance of the provider's site or the current requirement that basic information needed to complete a business transaction (e.g., payment instructions, delivery and shipping information, purchase preferences) must be repeatedly and manually provided by the consumer at each provider site. It is estimated that, currently, up to 40% of potential online transactions are ultimately not completed due to interactivity problems encountered by the consumer at the provider's site. Moreover, existing automated search systems capable of simply locating providers of goods and services (e.g., Sherlock™ from Apple Corp.) do not also provide a consumer with comparative pricing and availability or other comparative information regarding such goods and services. As an example, it is of little value to know that companies A, B & C offer limousine service in Manhattan. What is much more valuable to a potential consumer of such services is to immediately know that companies A & C, but not company B, have limousines available for the time period the consumer desires, and that company A offers that service at a lower price than company C.

The foregoing dilemma provides an opportunity for a unique system and method to serve as an intelligent intermediary between the consumers and the providers of online goods and services. To address this opportunity, there is a need for a system and method that, in response to an extremely simple and intuitive user request, can: (1) intelligently select and identify one or more, and preferably several, reputable and reliable providers of desired goods and services from which a potential consumer may choose one or more particular providers; and (2) provide the potential consumer with comparative pricing and availability (and, if needed other) information about the identified providers' goods and services so as to facilitate a fully-informed decision by the potential consumer as to which one or more providers with whom they desire to transact business.

In addition, there is often a need for a potential consumer to be informed regarding providers of logically-related goods and services. For example, a consumer of hotel reservations in Los Angeles will also likely have a need for providers of: rental cars; directions in Los Angeles; airline reservations, and the like.

There is also the need for such a system to include a common database of information regarding each consumer. Such a database would operate to eliminate repeated and manual provision of basic information required to complete online transactions. There is further a need for a system and method that provides a variety of other useful, ancillary features to the primary service of pairing online consumers and providers of goods and services, such as a feature that maintains the privacy of a consumer while they are communicating with the providers and a feature which selectively and confidentially shares personal information (e.g., credit card account information) of the consumer with an approved provider to facilitate the desired online transaction. Here again, a common database could facilitate the provision of such ancillary services.

Such a system would ideally operate not only with existing computer and telecommunications devices (e.g., pagers, hand-held personal communication devices), but also with future Internet-capable devices (e.g., vehicle-based telematic devices) for accessing a global communications network, providing a consistent and familiar interactive experience with a consumer regardless of how, and through what communication means, the system was accessed. The system would also ideally accommodate and interact with global positioning system-based applications, traditional and biometric security devices and voice activation/recognition and audio response systems. As more greatly detailed below, the foregoing and other needs are satisfied by the system and method of the present invention.

BRIEF DESCRIPTION OF THE INVENTION

The present invention comprises a system and method that operates as an automated, intelligent intermediary between a consumer and a provider of goods and services. More specifically, the system and method of the present invention operate to receive a request initiated by a consumer and transmitted over a global communication network, like the Internet, and process such request in an intelligent way to match that consumer with one or more providers of goods or services represented (or logically-suggested) by the request. Once identified and selected, the system preferably facilitates completion of one or more business transactions between the consumer and the provider(s) in a way which eliminates repeated and manual provision of basic transaction parameters (e.g., payment instructions, delivery/shipping information, purchase preferences) required to complete such transactions. Importantly, using the system and method of the present invention a consumer is provided with a consistent and familiar interactive experience, regardless of the manner in which the consumer communicates with the system, or the provider(s) intelligently selected by the system and with which the consumer transacts business.

The primary components of the system and method of the present invention are: the common database; the name request system and name linking policy; the selection and pairing system; the intelligent referral system; and the selective information sharing and information protection system. Although the term "consumer" is used throughout this application, it is noted that for purposes of the application the term "consumer" shall encompass both individual users as well as business ventures and enterprises of all kinds. Indeed, currently, the largest growing segment of transactions facilitated over a global communication systems like the Internet are business to business transactions. In business circumstances where the ability to immediately determine comparative pricing and availability information is critical, the system and method of the present invention would be invaluable.

An important feature of the system and method of the present invention is its use of a natural, intuitive name request system and name linking policy which allows a consumer to use an extremely simple and intuitive approach to requesting desired goods and services. In one embodiment of the name request system, a request is provided to the system using a simplistic and intuitive common domain name component (e.g., INEED) coupled with a specific object (e.g., A HOTEL ROOM) to form a domain name ("ineedahotelroom.com") which is entered into a browser or other means of interacting (e.g., a pager) with a global communications network such as the Internet.

Using this embodiment of the name request system, the system is fed any variety of requests from potential consumers by allowing them to simply and intuitively express their desire for goods or services using the simplistic format to form a URL or domain name. So, whether a consumer desires an automobile (e.g., ineedanewcar.com or ineedausedcar.com); a doctor (e.g., ineedadoctor.net or ineedaphysician.com or ineedanobgyn.com); temporary transportation (e.g., ineedalimousine.com, ineedataxi.net or ineedacab.com); a computer (e.g., ineedacomputer.net); lodging (e.g., ineedahotel.net, ineedhotelreservations.net or ineedahotelroom.com); directions (e.g., ineeddirections.com or ineedamap.net); companionship (ineedadate.net); employment (e.g., ineedajob.net); or gifts (e.g., ineedagift.net or ineedaflorist.com), the unique name request system of the present invention provides an immensely simplistic and, more importantly, intuitive entry into the system.

It is noted that by using a combination of a variety of top level domain name extensions and an intra-system search engine associated with each domain of the system, the name linking policy of the system will direct visitors requesting a good or service via slight variations on the "INEED" domain name common format to the appropriate web presence within the system. Accordingly, whether a consumer enters "ineedahotel.net", "ineedhotelreservations.com" or "ineedahotelroom.com", the consumer will be provided with the appropriate web presence for the system. The feature also eliminates the consumer's frustration with attempting to determine the proper top-level domain name extension (e.g., ".com") to use. Once a consumer has reached any domain in the system, the consumer seeking another domain of the system can reach the appropriate web presence of the system regardless of the top-level extension used by the consumer. The intra-system search engine feature alleviates the frustration many online consumers currently experience by placing the burden on the system to determine the actual source site of interest (e.g., ineedahotelroom.com) from a variety of potential requests (e.g., ineedahotel.net, ineedahotelroom.net, ineedamotel.net, etc.), rather than forcing the consumer to attempt several variations to locate the desired source site. If the system cannot locate a responsive domain, or the system-selected site is not satisfactory, the consumer will be referred to a default domain within the system for interaction with a concierge staff capable of assisting the consumer.

Other embodiments of the name request system and name linking policy allow the consumer to be more vague about his or her request for goods or services. For example, the system is capable of processing consumer requests in which the object component of the domain name is not a specific item. Examples include: "ineedtravel", in response to which a consumer might be provided access to maps, hotel reservations, airline reservations, driving directions, tourist information and the like; and "ineedfinancialservices", in response to which a consumer might be presented with everything from providers of online banking services and investment products to financial consultants, tax attorneys to stock and mutual fund brokers.

It is noted that the foregoing examples have been extremely limited in the interest of space, and that the system and method of the present invention functions optimally through the reservation and use of many hundreds, or even thousands, of domain names based upon one or more common formats. It is further noted that although the "INEED" common format has been described in some detail herein, other common formats are contemplated and encompassed by the present invention, including, by way of illustration and not limitation, "INEEDA", "INEEDAN", "IWANT", "IWANTA", "IWANTAN", "GETME", "GETMEA", "GETMEAN", "FINDME", "FINDMEA", "FINDMEAN" and the like. Moreover, foreign language-based common formats (e.g., "YOQUIERO", "NECESITO") are also contemplated and encompassed by the present invention.

In response to receiving a domain name produced using the name request system, the system of the present invention selects at least one provider which is logically related to the subject matter represented by the domain name. Thereafter, the system operates to provide information about the selected at least one provider to the consumer, wherein the consumer selects one or more providers from the selected at least one provider to communicate therewith. It is noted that the system can receive a consumer request via any suitable means of communication, including, without limitation, electronic mail, short message services (SMS) (e.g., "instant message") and web browsers.

Once a selection is made by the consumer, the system facilitates completion of a transaction between the consumer and the selected provider(s). In a preferred embodiment, the consumer is provided with detailed information (e.g., products/services descriptions, comparative pricing and availability information, photographs, video demonstrations, etc.) about the goods and services available from the selected provider(s) through the system's web presence. An important feature of this embodiment is that information about the selected provider(s) is provided seamlessly to the consumer via the web presence of the system using a common format. This feature not only produces a level of comfort and familiarity in the consumer regarding the system's functions, look and feel, but also precludes a consumer from having to familiarize himself or herself with the varying formats or organization of the various provider(s). The feature: (1) cultivates loyalty with the consumers for the system; and (2) boosts sales of the provider(s) since consumer sales are not lost when potential consumers are unwilling or unable to learn or use the provider's own, often foreign or confusing, function, look and feel.

In the preferred embodiment, the transaction between the consumer and the provider(s) is further facilitated by the system through the use of a common database including all of the consumer's financial information (e.g., credit card numbers), shipping or delivery information, buying preferences, and the like, preventing a consumer from having to repeatedly enter such routine and duplicative information into multiple provider sites; and enabling the system to optimize presentation of information generated by the system to the consumer based upon predetermined criteria. This component of the system can be likened to a "hub-and-spoke" model, in which all the web presences of the system (spokes) have access to, and can utilize information on a predetermined and selective basis from, a single common database (hub) containing the above-identified basic information. Use of this feature of the system allows a consumer to enter such information a single time, yet repeatedly use such information on a predetermined and selective basis to facilitate transactions with any provider identified and selected using the system and method of the present invention.

In another, less preferred embodiment of the system, the consumer is provided with an electronic link (e.g., hot link), if available, to access, and preferably facilitate an online transaction with, the selected provider(s). If such electronic link is not available, the system could also use electronic mail or other, more traditional contact information (e.g., telephone numbers, addresses) to facilitate commerce between the consumer and the provider(s). Such information can be provided in a variety of formats, including, without limitation, a customized web page sent to the requesting consumer. It is noted that this embodiment of the system is less preferred since once the consumer uses a more traditional method of contacting the selected provider(s) (e.g., via hot link or toll-free telephone number), the transaction facilitation components (e.g., common database and comparative pricing and availability information) of the system are no longer readily-available to the consumer. For example, using the less preferred embodiment the consumer will likely be required to repeatedly and manually provide such provider(s) with the basic transaction information (e.g., payment instructions, delivery and shipping information and purchase preferences) despite the fact that such information already exists in the common database of the system, and will not have access to comparative pricing and availability information associated with desired goods and services.

Another important feature of the system and method of the present invention is the name linking system, which automatically and logically associates a domain name requested (e.g., ineedahotelroom.com) with a family of logically-related domain names associated with the system (e.g., ineeddirections.net, ineedtogettickets.com, ineedaguide.net, ineedawakeupcall.com, etc.). Accordingly, the system allows a consumer to be provided with suggested goods and services most likely to be of immediate use or relevance, while allowing the providers of logically-related goods and services to specifically target such goods and services to the consumer.

It is noted that another feature of the name linking policy allows a consumer to predetermine the level of relationship between the consumer's name request and the provider(s) identified by the system (i.e., how tightly the system relates providers identified in response to a request by the consumers) and otherwise set personal preferences for the way in which the system provides that consumer with information in response to a request. For example, one consumer could desire to see only "highly" relevant providers in response to his name request, while another could desire that providers be identified which are merely loosely related to the domain name request entered. In the former, a consumer who entered the system using the name request "ineedabank.com" might only be provided with online providers of banking services (e.g., www.wingspan.com). In response to the same name request (ineedabank.com), the latter consumer might be provided not only providers of online banking services, but might also be presented with providers of mutual fund services, stock trading services, certified public accountants and investment counseling services. Another example of a predetermined relationship capable of customizing information provided by the system to the consumer is where a consumer limits responses by the system to a specific geographical area, in which case the former consumer listed above would be presented only with providers of banking services within the predetermined geographical location.

In one embodiment of the name linking policy, the system accomplishes this feature through the use of a arithmetic system capable of assigning a range of weighted values based upon relevancy, and selecting providers in response to consumer requests using such weighted relevancy values. While an arithmetic system of weighted values is described herein, it is noted that the system could determine relevance of providers identified in response to consumer requests using any suitable means known or hereinafter discovered.

The system and method of the present invention also includes services ancillary to the above-identified primary components to provide a consumer with protection, privacy and convenience related to the use of consumer data and information (e.g., personal identification information and online account data). As mentioned above, one such service provides a consumer with the option of entering his or her personal identification information (name, age, address, etc.) and financial information (e.g., credit card account information and payment preferences) a single time, allowing such information to be selectively provided to providers identified by consumer as a provider with which the consumer desires to transact business. This service allows a consumer to transact business with any number of providers (selected by the service in response to a name request or otherwise selected) without requiring the customer to separately provide each such provider with such information. Another service would be the inclusion of an anonymous browser within the system. Such an anonymous browser would provide the consumer with the ability to override the system's specific, logistically-related matching operability and casually browse web sites, viewing all of the content (graphics, photographs, video, extended menus, etc.) available on such sites, but preferably eliminated from the primary matching functions of the system. "Cookies" retained by the system's server(s) would facilitate operation of such a browser service. A third such service will include the availability of an intra-system search engine feature associated with each site in the system through which all other web presences of the system can be easily and quickly reached.

The system's ability to specifically and logically match online consumers and providers of goods and services, and facilitate business transactions between them, allows the system to operate significantly more efficiently (i.e., using less bandwidth) and quickly, thus making the system of the present invention idea for use with non-traditional global communication network access devices, such as pagers, hand-held personal communications devices and future Internet communication devices. Emerging communication technologies (e.g., voice recognition and activation) are also supported and favored by use of the present invention system and method, and its above-identified advantages.

The system of the present invention is capable of generating revenue through any number of known (or hereinafter developed) revenue models, including, without limitation, transactional fee sharing, advertising fees and link referral partnering.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

Figure 1:
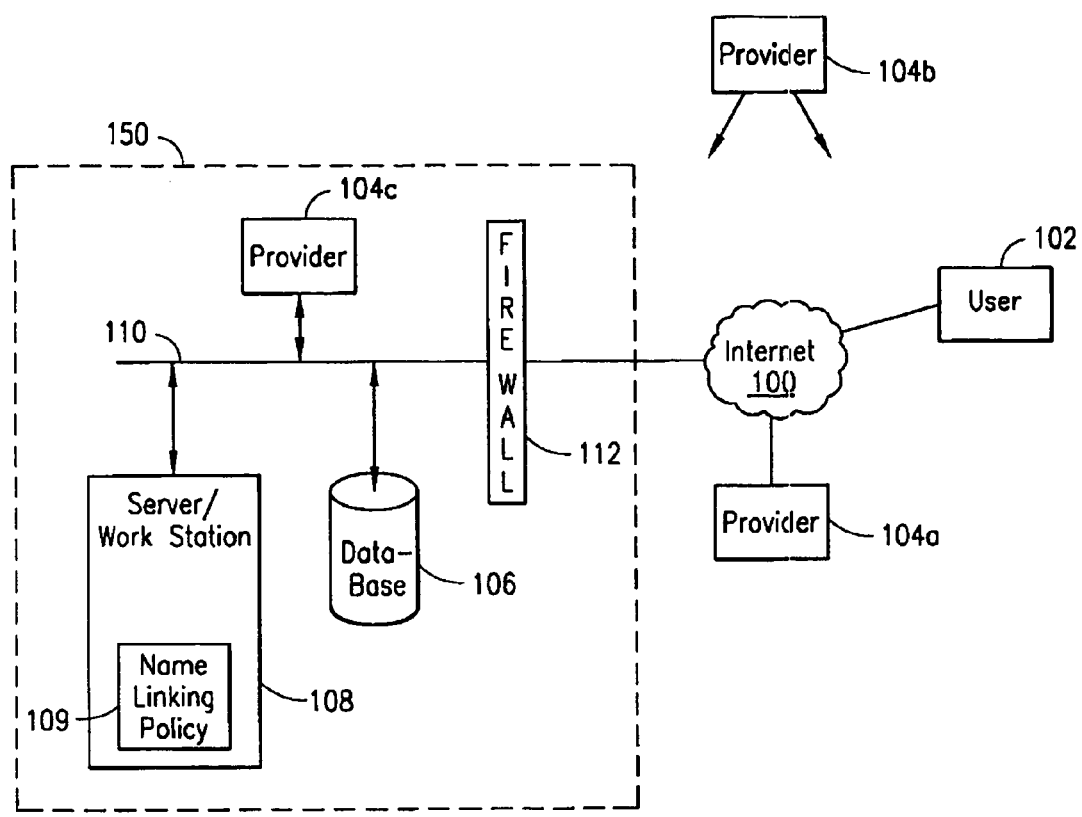
FIG. 1 is a block diagram illustrating the basic components of an exemplary system of the present invention.
Figure 2:
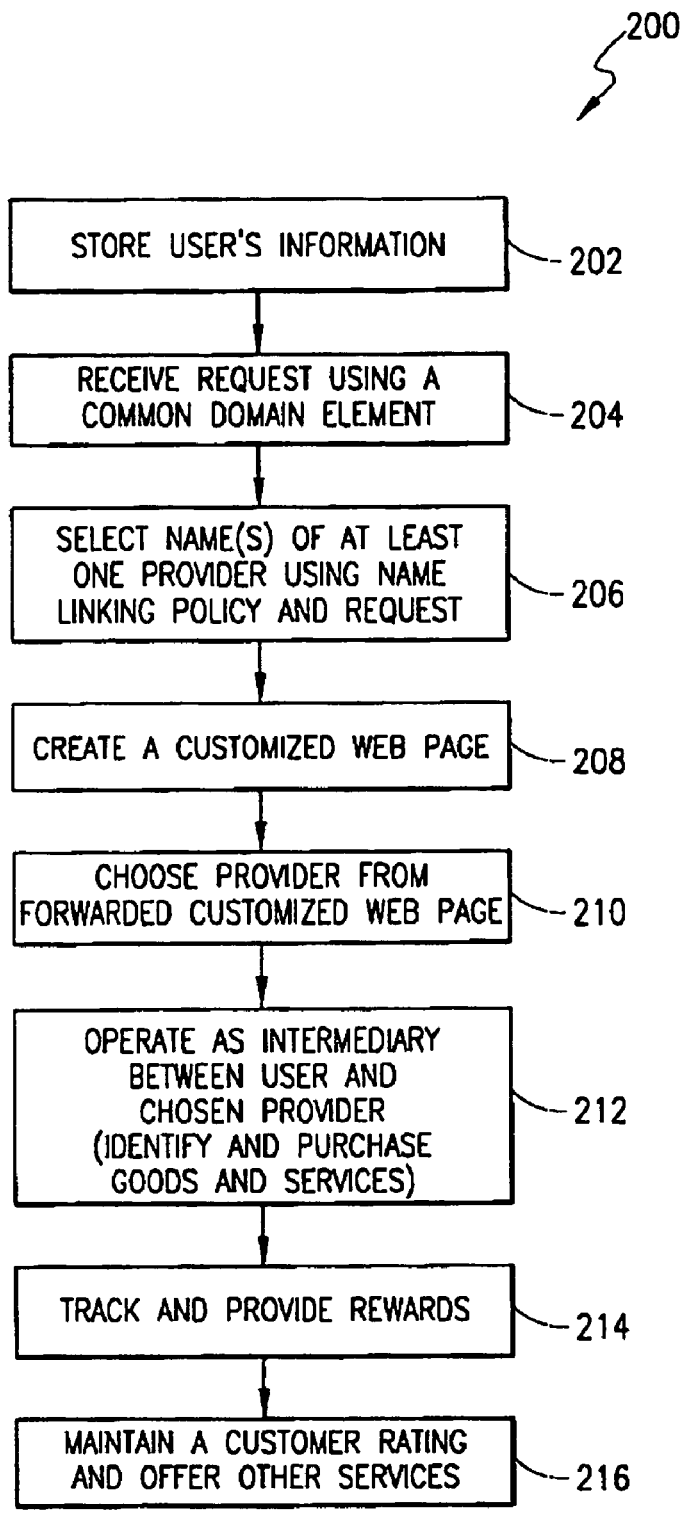
FIG. 2 is a simplified flowchart illustrating the basic steps of a preferred method of the present invention.

Referring to the Drawings, wherein like numerals represent like parts throughout FIGS. 1–2, there are disclosed an exemplary system 150 and a preferred method 200 in accordance with the present invention.

Referring to FIGS. 1 and 2, there are a block diagram illustrating the basic components of the system 150 and a flowchart illustrating the basic steps of the method 200 in accordance with the present invention. The system 150 and method 200 are both used in conjunction with a global communications network (e.g., the Internet) 100 of which many details are known in the industry and as such need not be described herein. Therefore, for clarity, the description provided below in relation to the Internet 100 omits components not necessary to understand the present invention.

The system 150 operates as an intermediary between consumers 102 (only one shown) and providers 104a, 104b and 104c (only three shown) of goods and services so that they can effectively be paired so as to conduct business with one another. As previously noted, such "consumers" encompass both individual users and business ventures or enterprises of all types. To do this the system 150 operates to intelligently select the names of one or more of the providers 104a, 104b and 104c from which the consumer 102 can choose a particular provider with whom a dialogue can be established via the Internet 100 or otherwise. The system 150 utilizes a request from the consumer 102 via any communications means known or hereinafter invented, and a name linking policy to intelligently select the names of the providers 104a, 104b and 104c. In addition, the system 150 operates to provide the consumer 102 and the providers 104a, 104b and 104c with a variety of other useful services, all of which facilitate any business transaction desired between the parties. Such services are described in detail below.

Now referring to FIG. 2, beginning at step 202 the consumer 102 (e.g., member or customer) inputs information to be stored in a database 106 of the system 150. Typically, the consumer 102 inputs the information prior to communicating with any of the providers 104a, 104b and 104c, but could also input such information at a different time. The type of information that is stored within the database 106 may include the personal preferences, payment instructions, personal identification information and privacy instructions of the consumer 102. Details associated with the personal preferences, payment instructions and privacy instructions are described in greater detail below. It is noted that it is neither necessary for every consumer 102 to enter all of the information noted above and described below to use the system 150, nor must the consumer 102 enter such information at any particular point in its use of the system 150. One notable advantage of this feature of the system 150 is that the database 106 is continually and automatically updated with use of the system 150 by the consumer 102 such that the consumer's most-relevant personal information, payment instructions, personal purchasing preferences and the like are always available for use by the system 150.

At step 204, the system 150 operates to receive a request initiated by the consumer 102 and transmitted through the Internet 100 or other communication device (e.g., pager, personal communication device). The request is preferably in a common format of a universal resource locator ("URL") or domain name (e.g., INEEDxxx.COM, wherein "xxx" is subject matter object-oriented) which is part of a whole family of domain names in such format (e.g., INEED-NEWS.NET, INEEDTOBUYACAR.COM and INEEDA401K.COM) that have been registered by the system 150. Each of the domain names includes a common domain name component (e.g., INEED) which has a common string of characters that is either intuitive to, or can be easily remembered by, the consumer 102. Thus, the consumer 102 only needs to add the desired object (e.g., "NEWS", "TOBUYACAR" OR "A401K") of interest to the common domain name component and submit the domain name via browser, pager or the like to the system 150. As mentioned above, since the system 150 optimally includes the two major, commercial top-level extensions (.com and .net) for each domain name in the system 150 and further includes an internal search mechanism capable of quickly identifying any other domain in the system 150, it does not matter which extension is used by a consumer 102 in a request once the consumer has reached any domain within the system. Technical pointers and the internal search mechanism are used by the system 150 to re-route, if necessary, a consumer 102 to the system's appropriate web presence.

Now referring to FIG. 1, the family of domain names is maintained by a server 108 (e.g., workstation) which is also a component of the system 150. The server 108 is coupled to the database 106 through a network that can be configured, for example, as a Local Area Network 110. In addition, the system 150 may include a fire wall 112 positioned between the Internet 100 and the Local Area Network 110 to provide protection against unwanted intrusion or access into the system.

At step 206 of FIG. 2, the system 150 uses a name linking policy 109 and the received request (e.g., INEEDABOOK.COM) to identify at least one of the providers 104a, 104b and 104c in response to the received request. The name linking policy 109 (e.g., name linking module) can be stored within the server 108 or at a remote location. In selecting the names of the providers 104a, 104b or 104c, the name linking policy 109 can use subject matter information (e.g., BOOK) derived from the request (e.g., INEEDABOOK.COM) along with geographic information, demographic information, and the personal preferences of the consumer 102 to generate a customized response to the request.

The geographic information typically indicates the home location (from the personal identification information) current location (from the request, IP address provided, or GPS technology), or future location (from the request) of the consumer 102, which enables the system 150 to intelligently select the providers 104a, 104b or 104c located within the geographic area of interest to the consumer 102, to optionally select providers of related goods and services for the consumer 102. There are a number of ways that the system 150 can determine the geographical location of the consumer 102. For example, the consumer 102 may simply provide the geographic information to the system 150. Alternatively, the system 150 can obtain the geographic information from a mobile communications system (not shown) if the consumer 102 happens to be using a mobile telephone or a digital terminal equipment (DTE) to contact the system. It is noted that, although not commonly utilized at this time, it is possible to technologically determine the geographic location of a user of the Internet merely through such usage. Such capability is likely to be used more extensively in the near future as these and other location-identification technologies (e.g., GPS) further advance, and is contemplated by the present invention.

The demographic information can be provided by the consumer 102 at the same time the consumer inputs his personal preferences into the database 106 (see step 202). The personal preference information can include a list of providers with whom the consumer 102 likes or desires not to have a business relationship. For instance, the consumer 102 may like staying at the Marriott® or the Sheraton® while in Boston and the Anatole® Hotel or the Fairmont® Hotel while in Dallas, and in no city does the consumer like to stay at a Motel Six®. It should be understood that the personal preferences and demographic information submitted by the consumer 102 can include all types of special requests and data which will assist the system 150 in intelligently responding to a consumer request. Additionally, as with all information tracked by the database 106, geographic information about the consumer 102 is continually and automatically updated with use of the system 150 by the consumer 102.

As an illustrative example of the operation of the name linking policy 109, the consumer 102 may need to rent a car while on a business trip in Dallas and as such would access the Internet and transmit a request to the system by entering the domain name of "ineedtorentacar.com". In response, the system 150 determines that the consumer 102 desires to rent a car simply by looking at the subject matter portion of the request or that the consumer has directly accessed the domain. Next, the name linking policy 109 selects the names of the providers 104a, 104b and 104c that rent cars in Dallas while also using the personal preferences (e.g., consumer is a Hertz #1 Gold® member and dislikes Dollar Rent-A-Car®) and the geographic information (e.g., via GPS technology or itinerary information present via the common database of the system) of the consumer 102 to further refine the response. In addition to selecting the providers 104a, 104b and 104c that rent cars in Dallas, the name linking policy 109 can also select the names of the providers 104a, 104b and 104c offering goods or services that may be of interest to consumer 102 that is renting a car in Dallas. For instance, the name linking policy 109 may select the names of the providers 104a, 104b and 104c that provide goods and services in the Dallas area related to, for example, entertainment, restaurants, airports, and hotels.

In a preferred embodiment, the name linking policy 109 generally selects the names of providers 104a, 104b and 104c that have previously agreed to be a partner with programs initiated by the system 150. On the other hand, in another embodiment the name linking policy 109 can also select the names of providers 104a, 104b and 104c that have no prior relationship with the system 150. The providers 104a, 104b and 104c can include the providers 104a that have their own web page on the Internet 100, the providers 104b that do not have a web page but instead has electronic mail or other, more traditional contact information (e.g., a telephone number, fax number, store address), and the providers 104c that are directly associated with the system 150. In a preferred embodiment, the system 150 would select the names of providers 104a, 104b and 104c that are partners with the system such that information can be provided and transactions completed between the providers 104a, 104b and 104c and the consumer 102 in a seamless manner previously described. The system 150 could also rank or otherwise provide information to the consumer 102 about the providers 104a, 104b and 104c based upon prior consumer satisfaction, relative pricing and the like.

At step 208, the system 150 operates to create and customize a seamless means of connecting the consumer 102 with the selected providers 104a, 104b and 104c. In a preferred embodiment, a customized web page is generated which contains detailed information (e.g., comparative pricing and availability) about the desired goods and/or services of the providers 104a, 104b and 104c that were selected by the name linking policy 109 (see step 206) in response to a request. The customized web page can be in a format chosen by the consumer 102 (either as part of the personal preference information or as each response is generated by the system 150), wherein, for example, the selected web page may not include all the advertising generally associated with the web pages of traditional search engines or would rank the providers selected by one or more factors (e.g., price or reputation). The seamless experience provided by the system is accomplished, in part, by technologically-advanced programming options, such as mark up languages capable of fluid and flexible treatment of structure content, like XML.

At step 210, the system 150 operates to present, by way of the Internet 100, the customized web page or Wireless Application Protocol or other presentation format to the consumer 102. Importantly, regardless of the consumer's route of entry to the system (e.g., computer, pager, cellular telephone, hand-held personal communication device), the system will recognize the consumer (if that consumer has previously used the system) and will present a consistent and seamless experience to said consumer based upon the information available from the common database.

At step 212, the system 150 operates as an intermediary between the consumer 102 and the chosen provider 104a, 104b or 104c so that they can effectively conduct business with one another. In functioning as an intermediary, as described in greater detail below the system 150 enables the consumer 102 to identify, comparatively price, check availability and purchase the goods and services offered by the chosen providers 104a, 104b and 104c. In a preferred embodiment, the consumer 102 can simply transact business with one or more of the selected providers 104a, 104b and 104c through the customized web page. This manner of interaction is preferred since it: (1) provides the consumer 102 a single, customized format for the provision of detailed information about the desired goods and/or services of the selected providers 104a, 104b and 104c; (2) provides the consumer 102 a familiar, customized format in which to transact business with the selected providers 104a, 104b and 104c; (3) provides the selected providers 104a, 104b and 104c with selected (discussed below) and specific (discussed below) information about the consumer 102 to facilitate business transactions between the parties; and (4) boosts sales of the goods and services of the selected providers 104a, 104b and 104c by the consumer 102 who is unwilling or unable to learn the often foreign and confusing functions, look and feel of the sites of the selected providers 104a, 104b and 104c.

The system 150 allows the consumer 102 to interact with the chosen providers 104a and 104c in accordance with the stored privacy instructions (see step 202). The stored privacy instructions can direct the system 150 to make the consumer's information (e.g., identity and e-mail address) freely available to the providers 104a, 104b and 104c. Alternatively, the stored privacy instructions can direct the system 150 to keep the consumer's information from the providers 104a, 104b and 104c, or to make the consumer's information available only when authorized by the consumer 102. Of course, this enables the consumer 102 to have control of their "private information" when communicating over the very public Internet 100.

Moreover, in the preferred embodiment the system 150 operates to enable the consumer 102 to directly purchase the goods or services offered by the chosen providers 104a, 104b and 104c through the customized web page or Wireless Application Protocol or other presentation formats generated by the system 150. To accomplish this the consumer 102 can choose to allow the system 150 to act as the intermediary between the consumer and chosen providers 104a, 104b and 104c in accordance with the stored privacy instructions (discussed above) and the stored payment instructions (see step 202) as described below. Alternatively, in another, less preferred embodiment of the system and method of the present invention, the consumer 102 can simply call or otherwise contact the chosen provider 104a, 104b or 104c using the contact information provided by the system 150 and complete the transaction in one or more traditional manners.

In a preferred embodiment, the stored payment instructions can direct the system 150 to furnish, at the time of each transaction, the chosen providers 104a, 104b and 104c with a stored debit or credit card number of the consumer 102. This payment instruction allows for the payment of goods and services without requiring the consumer 102 to enter his debit or credit card number during each transaction. If desired for privacy purposes, the system 150 can also complete the consumer's transaction without directly providing payment or other information about the consumer to the provider(s). Examples of such additional protective measures include, but are not limited to: (1) completion of transactions for the consumer 102 using a card number assigned to the system 150 which then automatically rebills the account of the consumer 102; and (2) utilization of contractual payment arrangements between the system 150 and the providers (e.g., the system 150 automatically cuts a check to the provider(s) under prearranged terms and conditions).

In another embodiment, the consumer 102 may choose one or more of the selected providers 104a, 104b and 104c that he desires to contact outside the customized web page. To contact the providers 104a, 104b and 104c, the consumer 102 can select the domain name of the chosen provider's web page via an electronic link (e.g., hot link) or simply call or otherwise contact the chosen provider in order to identify, compare and purchase the wanted goods or services.

At step 214, the system 150 further operates to track and provide rewards based on the type and number of transactions made by the consumer 102 over a given time period. This service not only rewards loyalty of consumers 102 to the system 150, but provides the system 150 with invaluable consumer-spending information which can be utilized to improve the system 150 and the selection of providers in response to consumer requests.

At step 216, the system 150 can operate to maintain a rating corresponding to the satisfaction level of one or more of the consumers 102. The rating can be a customer rating related to the quality of goods or services provided by a particular provider and can be used by other components of the system 150 to classify providers in response to requests.

In addition, the system 150 can provide a variety of other useful services including (for example): (1) lost and found notification; (2) separated luggage tracking; (3) loyalty program tracking; (4) service upgrade management services; (5) itinerary reports; (6) expense reports; (7) insurance claims processing; (8) calendars; (9) warranty registration services; (10) complaint services; (11) concierge services; (12) bill tracking and payment services; (13) news and sports information; (14) various cultural services; (15) customized traffic and weather reports; and (16) any array of e-mail, facsimile, voice, voice mail, video and video conference communications services.

The system 150 can generate revenue for an operator of the system 150 in one or a number of ways. For example, the system 150 may require providers who wish to be associated with the system 150 to pay to the system 150 a small percentage of each transaction such provider completes which came to the provider through the system 150. The system 150 could also generate income by charging the consumer 102 a small (set or percentage) fee associated with each request response generated by the system 150 for the consumer 102. Revenue could also be generated by the system 150 through advertising revenue associated with its web presences and custom pages produced for consumers 102 in response to requests and/or traditional online referral partner relationships. While the foregoing represent a few avenues for the generation of revenue by the system 150, it is noted that any use of the system which could generate revenue is contemplated by the present invention.

From the foregoing, it can be readily appreciated by those skilled in the art that the present invention provides a system and method that intelligently selects the names of several providers and pairs them with a consumer in an effort to facilitate the transaction of business. Also, the system and method as disclosed functions as an intermediate between the consumer and the various providers, providing comparative pricing and availability information while maintaining the privacy of the consumer and offering a variety of other useful services. In addition, the system and method utilize a wide variety of wireless and communication systems to present a consumer with a consistent and seamless experience while operating as an intermediary. As a result, a consumer is capable of making optimized commercial transaction choices utilizing the features of the system in an extremely efficient and pleasing manner.

Although several embodiments of the system and method of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method comprising:
   maintaining a database of personal information relating to a consumer, the database associated with a plurality of domain names and the personal information including a list of preferred providers identified by the consumer or by prior purchases thereby;
   receiving a request initiated by the consumer and transmitted over a global communication network to a system associated with the plurality of domain names, wherein the request includes one of the plurality of domain names and the domain name included in the request includes an identification of a subject of the request without identifying a specific provider thereof;
   identifying, responsive to the received request initiated by the consumer and based upon the request and the preferred providers in the database, at least one name of at least one provider;
   forwarding the identified at least one name of the at least one provider from said system to said consumer, wherein said consumer is subsequently capable of choosing a provider from the identified at least one provider to communicate therewith; completing a transaction between the consumer and a provider selected from the identified at least one provider; and
   updating the personal information based on the completed transaction, wherein the updated personal information is accessible by the system for use in connection with a subsequent request initialed by the consumer that includes a different one of the plurality of domain names, with the domain name included in the subsequent request including an identification of the subject of the subsequent request.

2. The method of claim 1, wherein each of the plurality of domain names includes a common domain name element, said domain name identifying goods/services, said common domain name element is in the form INEED SUBJECT.XXX, where "SUBJECT" is a consumer-selected subject matter object and "XXX" is a consumer-selected, top-level extension of the domain name.

3. The method of claim 2, wherein identifying at least one name further includes using a name linking policy to select the at least one name of the at least one provider while utilizing one or a combination of subject matter information, demographic information and geographic information.

4. The method of claim 1, wherein the global communication network is the Internet.

5. The method of claim 1, wherein forwarding the identified at least one name of the at least one provider further includes providing comparative pricing and availability information about goods and services offered by said at least one provider.

6. The method of claim 1, further comprising creating a customized presentation for use by said consumer, said customized presentation containing the identified at least one name of the at least one provider and detailed information about goods and services offered by the at least one provider.

7. The method of claim 6, wherein the customized presentation is selected from the group consisting of: web page, Wireless Application Protocol, and other data communication formats.

8. The method of claim 1, wherein said consumer-provided personal information relating to the consumer includes personal preferences, payment instructions, and privacy instructions.

9. The method of claim 8, wherein said payment instructions include instructions to complete transactions for said consumer in an anonymous manner.

10. The method of claim 9 wherein said instructions include instructions to complete transactions according to a predetermined payment arrangement with said chosen provider.

11. The method of claim 8, wherein said payment instructions include instructions to complete transactions using a card number of the system and rebill said consumer for said complete transactions.

12. The method of claim 1, further comprising operating, within said system, as an intermediary between said consumer and said chosen provider, wherein the intermediary is associated with the at least one domain name.

13. The method of claim 12 wherein operating as an intermediary further includes enabling said consumer to purchase the goods or services of the chosen provider in accordance with payment instructions submitted by said consumer and stored within said database.

14. The method of claim 12 wherein operating as an intermediary further includes the steps of tracking and awarding rewards based on transactions made by said consumer.

15. The method of claim 12 wherein operating as an intermediary further includes tracking and ranking a satisfaction level of said consumer.

16. The method of claim 1, wherein said personal information relating to the consumer includes privacy instructions submitted by the consumer, and the method further comprises enabling the consumer to purchase the goods or services offered by said at least one provider chosen by the consumer, the purchase being in accordance with the privacy instructions submitted by said consumer.

17. The method of claim 16 wherein said privacy instructions include instructions to make information, alternatively, freely available, available only when authorized by said consumer, or never available to the chosen provider or third parties.

18. The method of claim 1, wherein said request includes a common name identifying goods or services without identifying a particular provider thereof, and identifying at least one name further includes using the common name and a name linking policy to select the at least one name of the at least one provider while utilizing one or a combination of demographic information and geographic information of the consumer.

19. The method of claim 1, further comprising storing, within said system, information associated with said consumer including at least one of a personal preference, a payment instruction, and a privacy instruction.

20. The method of claim 1, wherein receiving a request involves receiving the request from any one of the following: a desktop device capable of communicating information, and a hand-held device capable of communicating information.

21. The method of claim 1, further comprising updating the personal information relating to the consumer in the database so that the list of preferred providers is updated to reflect the consumer choosing a provider from the identified at least one provider to communicate therewith.

22. The method of claim 21 wherein updating the personal information involves automatically updating the personal information relating to the consumer in the database so that the list of preferred providers is updated to reflect the consumer choosing a provider from the identified at least one provider to communicate therewith.

23. The method of claim 1 further comprising conducting a subsequent communication by the consumer, wherein the subsequent communication by the consumer comprises completing a transaction with the identified at least one provider using data stored in the database of personal information.

24. The method of claim 1 wherein the updated personal information is accessible by the system for use in identifying a provider based upon the subsequent request and the updated personal information.

25. The method of claim 1 further comprising identifying, responsive to the subsequent request, at least one provider wherein the updated personal information is accessible by the system for use in completing a transaction between the consumer and a selected one of the at least one provider.

26. The method of claim 25 wherein the updated personal information comprises payment information.

27. The method of claim 1 wherein the personal information further includes at least one personal purchasing preference and identifying at least one name of at least one provider is further based on a personal purchasing preference included in the personal information.

28. A system comprising:
 a database operable to store information associated with a consumer, the database associated with a plurality of domain names and the information including a list of preferred providers identified by the consumer or by prior purchases made thereby; and
 a server, in communication with the database, operable to receive a request initiated by said consumer and transmitted over a global communication network, the server associated with the plurality of domain names and the request including one of the plurality of domain names, with the domain name included in the request including an identification of a subject of the request without identifying a specific provider thereof said server further including:
  a module operable to select, responsive to the received request and based upon said request and said preferred providers stored in the database, at least one name of at least one provider; and
  a controller operable to forward the selected at least one name of the at least one provider to said consumer, wherein said consumer is then capable of choosing a provider from the selected at least one provider to communicate and complete a business transaction therewith, the server being further operable to:
   update the information associated with the consumer based on the completed transaction; and
   access the updated information for use in connection with a subsequent request initiated by said consumer, wherein the subsequent request includes a different one of the plurality of domain names and the domain name included in the subsequent request identifying a subject of the subsequent request.

29. The system of claim 28 wherein the global communications network is the Internet.

30. The system of claim 28 wherein each of the plurality of domain names includes a common domain name element, and said common domain name element is represented as INEEDSUBJECT.XXX, where "SUBJECT" is a subject matter object and "XXX" is a top-level extension for the domain name.

31. The system of claim 28 wherein said module is operable to select the at least one name of the at least one provider using one or a combination of subject matter information, demographic information, and geographic information associated with said consumer and stored in said database.

32. The system of claim 31 wherein the subject matter information is maintained by the system in a database accessible by all domains of the system.

33. The system of claim 28 wherein said controller is operable to enable said consumer to identify the goods or services offered by said chosen provider, evaluate the goods or services offered by said provider by one or more criteria, and enable said consumer to purchase the goods or services of the chosen provider.

34. The system of claim 33 wherein the one or more criteria includes comparative pricing and availability information regarding goods and services offered by said chosen provider.

35. The system of claim 28 wherein said module is operable to select the at least one name of the at least one provider using one or a combination of demographic information and geographic information.

36. The system of claim 28 wherein the server is capable of receiving the request from any of the following: a desktop device capable of communicating information, and a hand-held device capable of communicating information.

37. The system of claim 28 wherein the system automatically updates the information associated with the consumer and stored in the database so that the list of preferred providers is updated to reflect the consumer choosing a provider from the selected at least one provider with which to complete a transaction.

38. A method for providing a consumer with a customized presentation containing the names of various providers of goods and services that are selected, said method comprising:

storing, within an intermediary system, consumer-provided information associated with said consume;

receding a request initiated by said consumer and transmitted over a global communication network to said intermediary system, said request being a domain name associated with the intermediary system, with the domain name identifying a subject of the request without identifying a specific provider thereof;

selecting, responsive to the received request and based upon said information associated with said consumer and stored in said intermediary system, at least one name of at least one provider;

forwarding the selected at least one name of the at least one provider within a customized presentation to said consumer, wherein said consumer is then capable of choosing a provider from the selected at least one provider to communicate and, optionally, transact business therewith;

operating, within said intermediary system, as an intermediary between said consumer and said chosen provider; and updating the information associated with the consumer based upon a provider chosen thereby with which to transact business, wherein the information is updated for future use in selecting, responsive to a subsequent received request and based upon the updated information, at least one name of at least one provider.

39. The method of claim 38 wherein operating as an intermediary further includes:

enabling said consumer to identify the goods or services offered by said chosen provider in accordance with privacy instructions submitted by said consumer and stored within said intermediary system;

enabling said consumer to select for purchase said goods or services of said chosen provider using one or more criteria for same; and enabling said consumer to purchase said goods or services of the chosen provider in accordance with payment instructions submitted by said consumer and stored within said intermediary system.

40. The method of claim 39 wherein the one or more criteria includes comparative pricing and availability information regarding said goods and services of said chosen provider.

41. The method of claim 39 wherein said privacy instructions allow the consumer to transact business with the chosen provider in an anonymous manner.

42. The method of claim 41 wherein the anonymous manner allows the consumer to transact business with the chosen provider using a payment method of the system and to be rebilled by the system for same.

43. The method of claim 38 wherein the domain name is associated with a plurality of domain names, each of which includes a common domain name element, and said common domain name element is represented as INEEDSUBJECT.XXX, where "SUBJECT" is a subject matter object and where "XXX" is a top-level extension of the domain name.

44. The method of claim 38 further comprising tracking and awarding rewards based on transactions made by said consumer.

45. The method of claim 38 wherein the global communication network is the Internet.

46. The method of claim 38 wherein said customized presentation is selected from the group consisting of: web page, Wireless Application Protocol and other data communication formats.

47. A method comprising:

maintaining a database of personal information relating to a consumer, the personal information including a list of at least one preferred provider of goods or services;

receiving a search request initiated by the consumer over a global communications network, the Request comprising a domain name identifying a type of goods or services without identifying a specific provider thereof;

identifying, in response to the received search request, one or more providers of the type of goods or services requested based upon the at least one preferred provider, presenting the one or more providers to the consumer, enabling the consumer to complete a transaction with a provider from the one or more providers chosen by the consumer; and updating the list of at least one preferred provider based upon the one or more providers chosen by the: consumer to complete the transaction, wherein the list of at least one preferred provider is undated to identify the chosen provider as a preferred provider for future use in selecting, responsive to a subsequent received request.

48. The method of claim 47 wherein the personal information in the database relating to the consumer comprises payment instructions provided by the consumer.

49. The method of claim 47 wherein the personal information in the database relating to the consumer comprises consumer-provided credit card information of a credit card account of the consumer.

50. The method of claim 47 wherein the personal information in the database relating to the consumer comprises a consumer-provided instruction that transactions are to be completed without using payment information relating to the consumer, and that the consumer is to be billed for the transactions separately.

51. The method of claim 47 wherein the personal information in the database relating to the consumer comprises a consumer-provided instruction that the identity of the consumer is not to be communicated with the chosen provider in completing the transaction.

52. The method of claim 47 wherein identifying one or more providers comprises identifying the one or more providers based upon the personal information in the database relating to the consumer.

53. The method of claim 52 wherein the personal information relating to the consumer includes a name of one or more providers with which the consumer prefers to transact business.

54. The method of claim 47 wherein the personal information relating to the consumer includes one of demographic information and geographic information associated with the consumer.

55. The method of claim 47 wherein receiving a search request involves receiving the request from any one of the following: a desktop device capable of communicating information, and a hand-held device capable of communicating information.

56. An apparatus for facilitating a transaction between a consumer and a provider of goods or services over communications network, the apparatus being adapted to:

maintain a database of personal information relating to a consumer wherein the personal information relating to the consumer includes a list of a plurality of consumer-provided names of one or more providers with which the consumer prefers to transact business;

receive a search request initiated by the consumer over a global communications network, the request identifying a type of goods or services, the search request having a single set of characters forming a plurality of fields, a first field having a common name as between different search requests and a second field identifying the type of goods or services to be searched without specifying a specific provider of goods or services;

identify, responsive only to the search request without additional search information being directly provided by the consumer, one or more providers of the type of goods or services requested, this one or more providers being identified based upon the personal information relating to the consumer in the database;

present the one or more providers to the consumer; and enable the consumer to complete a transaction with a provider from the one or more providers chosen by the consumer using the personal information in the database wherein the list is automatically undated to reflect the consumer completing a transaction with the provider chosen by the consumer.

57. The apparatus of claim 56 wherein the personal information in the database relating to the consumer comprises payment instructions provided by the consumer.

58. The apparatus of claim 56 wherein the personal information in the database relating to the consumer comprises consumer-provided credit card information of a credit card account of the consumer.

59. The apparatus of claim 56 wherein the personal information in the database relating to the consumer comprises a consumer-provided instruction that transactions are to be completed without using payment information relating to the consumer, and that the consumer is to be billed for the transactions separately.

60. The apparatus of claim 56 wherein the personal information in the database relating to the consumer comprises a consumer-provided instruction that the identity of the consumer is not to be communicated with the chosen provider in completing the transaction.

61. The apparatus of claim 56 wherein the one or more providers are identified based upon the personal information in the database relating to the consumer.

62. The apparatus of claim 61 wherein the personal information relating to the consumer includes a consumer-provided name of one or more providers with which the consumer prefers to transact business.

63. The apparatus of claim 61 wherein the personal information relating to the consumer includes one of demographic information and geographic information of the consumer.

64. The apparatus of claim 56 wherein the apparatus is capable of receiving the request from any one of the following: a desktop device capable of communicating information, a hand-held device capable of communicating information, and a vehicle based device.

65. A method comprising:

maintaining a database of personal information relating to a consumer;

receiving a request initiated by the consumer and transmitted over a global communication network to a system, said request having a single set of characters forming a plurality of fields, a first field having a common name as between different requests and a second field identifying a type of goods or services without identifying a specific provider thereof;

selecting, responsive only to the received request initiated by the consumer without additional search information being directly provided by the consumer and based upon the personal information relating thereto in the database, at least one name of at least one provider;

forwarding the selected at least one name of the at least one provider from said system to said consumer, wherein said consumer is subsequently capable of choosing a provider from the selected at least one provider to communicate therewith; and updating the database of personal information for subsequent selections of at least one provider, based upon the provider chosen by the consumer with which to communicate.

66. The method of claim 65 wherein the said common domain name element is in the form INEEDSUBJECT.XXX, where "SUBJECT" is a consumer-selected subject matter object and "XXX" is a consumer-selected, top-level extension of the domain name.

67. The method of claim 65 wherein selecting at least one name further includes the step of using a name linking policy to select the at least one name of the at least one provider while utilizing one or a combination of subject matter information, demographic information and geographic information maintained in the database of personal information.

68. The method of claim 65 wherein said personal information includes one or more of personal preferences of the consumer towards providers of goods/services, payment instructions and privacy instructions.

69. The method of claim 68 wherein said privacy instructions include instructions to make information, alternatively, freely available, available only when authorized by said consumer, or never available to the chosen provider or third parties.

70. The method of claim 68 wherein said payment instructions include instructions to complete transactions for said consumer in an anonymous manner.

71. The method of claim 68 wherein said payment instructions include instructions to complete transactions using a card number of the system and to rebill said consumer for said complete transactions.

72. The method of claim 68 wherein said payment instructions include instructions to complete transactions according to a predetermined payment arrangement with said chosen provider.

73. A system comprising:

a database operable to store information associated with a consumer;

a server, communicably coupled to the database, operable to receive a request initiated by said consumer and transmitted over a global communication network, the request comprising a single set of characters representative of typed text, the typed text including a first field having a common name as between different requests and a second field for identifying at least one type of goods or services without identifying a specific provider thereof, said server further including:

a module operable to select, responsive to the received request without additional information directly provided by the consumer and based upon personal information relating to the consumer in the database, at least one name of at least one provider; and a controller operable to forward the selected at least one name of the at least one provider to said consumer, wherein said consumer is thereafter enabled to choose a provider from the selected at least one provider to communicate and selectively complete a transaction therewith, wherein the information associated with the consumer is automatically updated for subsequent selections by the module, based upon the provider chosen by the consumer with which to complete a transaction.

74. The method of claim 73 wherein the said common domain name element is in the form INEEDSUBJECT.XXX, where "SUBJECT" is a consumer-selected subject matter object and "XXX" is a consumer-selected, top-level extension of the domain name.

75. The system of claim 73 wherein said module includes a name linking policy to select the at least one name of the at least one provider while utilizing one or a combination of subject matter information, demographic information and geographic information maintained in the database of personal information.

76. The system of claim 73 wherein said personal information includes one or more of personal preferences of the consumer towards providers of goods/services, payment instructions and privacy instructions.

77. The system of claim 76 wherein said privacy instructions include instructions to make information, alternatively, freely available, available only when authorized by said consumer, or never available to the chosen provider or third parties.

78. The system of claim 76 wherein said payment instructions include instructions to complete transactions for said consumer in an anonymous manner.

79. The system of claim 76 wherein said payment instructions include instructions to complete transactions using a card number of the system and to rebill said consumer for said complete transactions.

80. The system of claim 76 wherein said payment instructions include instructions to complete transactions according to a predetermined payment arrangement with said chosen provider.

* * * * *